United States Patent
Ostertag et al.

(10) Patent No.: US 12,326,861 B2
(45) Date of Patent: Jun. 10, 2025

(54) PIPELINE BYPASS FOR CERTAIN QUERY PLAN OPERATORS

(71) Applicant: SAP SE, Walldorf (DE)

(72) Inventors: Alexander Ostertag, Karlsruhe (DE); Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/354,963

(22) Filed: Jul. 19, 2023

(65) Prior Publication Data
US 2025/0028724 A1 Jan. 23, 2025

(51) Int. Cl.
*G06F 16/2453* (2019.01)

(52) U.S. Cl.
CPC .............. *G06F 16/24545* (2019.01)

(58) Field of Classification Search
CPC ........... G06F 16/2455; G06F 16/24542; G06F 16/24545
USPC ......................... 707/713, 718, 769
See application file for complete search history.

(56) References Cited

U.S. PATENT DOCUMENTS

| | | | |
|---|---|---|---|
| 2009/0228433 A1* | 9/2009 | Aguilar Saborit | G06F 16/24556 707/E17.017 |
| 2012/0330924 A1* | 12/2012 | Rajan | G06F 16/2453 707/718 |
| 2014/0156636 A1* | 6/2014 | Bellamkonda | G06F 16/24556 707/718 |
| 2014/0280030 A1* | 9/2014 | Freedman | G06F 16/24542 707/718 |
| 2018/0150517 A1* | 5/2018 | Merker | G06F 16/24542 |

\* cited by examiner

*Primary Examiner* — Phong H Nguyen
(74) *Attorney, Agent, or Firm* — Mintz Levin Cohn Ferris Glovsky and Popeo, P.C.

(57) ABSTRACT

In some implementations, there is provided pipeline bypassing of certain operators. In some implementations, a method includes generating a query plan including at least one pipeline of operators; determining whether the at least one pipeline of operators includes a first operator that requires a complete result set as an input and further includes a second operator that supports providing the complete result set using a state identified by a state reference; and in response to determining the at least one pipeline of operators includes the first operator that requires the complete result set as the input and further includes the second operator that supports providing the complete result set using the state identified by the state reference, bypassing in the query plan pipelining between the first operator and the second operator.

20 Claims, 7 Drawing Sheets

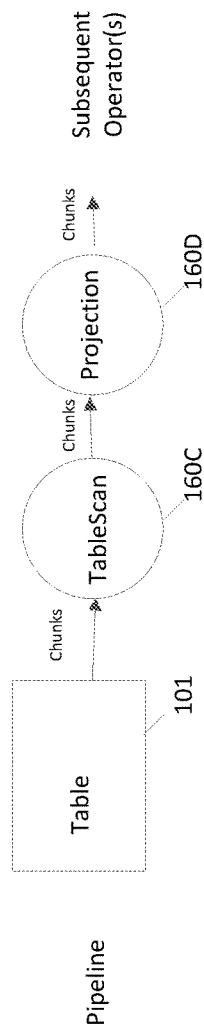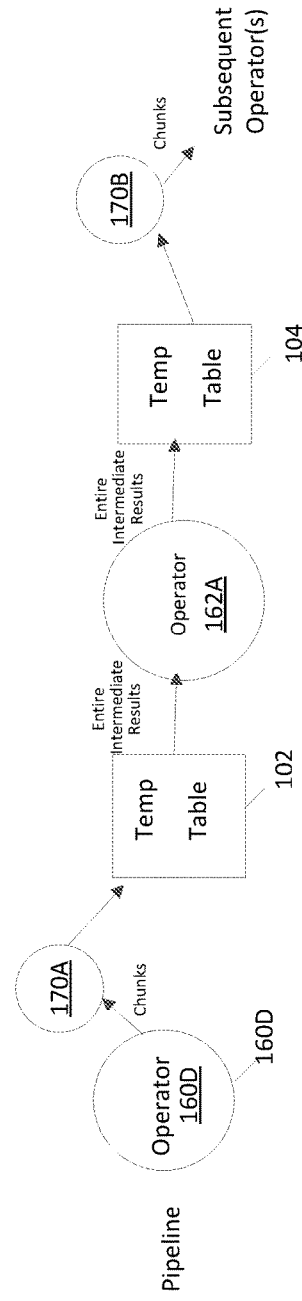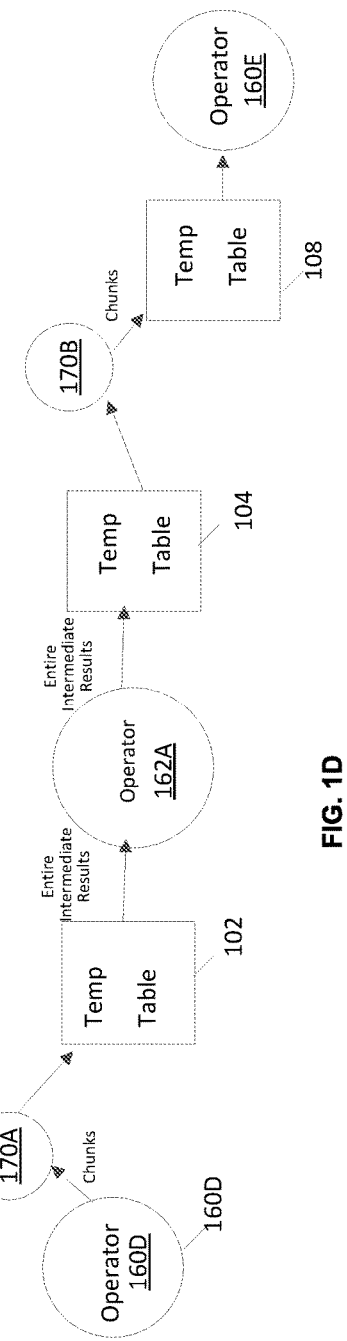
FIG. 1B
FIG. 1C
FIG. 1D

PIPELINE BYPASS FOR CERTAIN QUERY PLAN OPERATORS

TECHNICAL FIELD

The subject matter described herein relates generally to database processing and more specifically to database query optimization.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for pipeline bypassing of certain operators. In some implementations, a method includes generating a query plan including at least one pipeline of operators; determining whether the at least one pipeline of operators includes a first operator that requires a complete result set as an input and further includes a second operator that supports providing the complete result set using a state identified by a state reference; in response to determining the at least one pipeline of operators includes the first operator that requires the complete result set as the input and further includes the second operator that supports providing the complete result set using the state identified by the state reference, bypassing in the query plan pipelining between the first operator and the second operator; and in response to determining the second operator does not support providing the complete result set using the state identified by the state reference, continuing to use, in the at least one pipeline, one or more chunks to exchange data, during execution of the query plan, between the first operator and the second operator.

In some variations, one or more features disclosed herein including one or more of the following features may be implemented as well. A database execution engine, may receive a query from a client device. In response to receiving the query, the query plan may be generated by the database execution engine. The complete result set may include all of the data generated by a table scan, rather than a portion of the data. The state may include an object that is generated during execution of the query plan to include all of the data from the table scan. The bypassing may include configuring the first operator and the second operator to exchange data using, during execution of the query plan, the state identified by the state reference. The query plan may be executed. During execution of the query plan that has been configured for the bypassing between the first operator and the second operator, data may be exchanged between the first operator and the second operator using the state identified by the state reference. During execution of the query plan that continues to use the pipelining between the first operator and the second operator, data may be exchanged between the first operator and the second operator using the one or more chunks.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the allocation of worker threads to resume execution of a query execution plan, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIGS. 1A-1E depict examples of portions of directed acyclic graphs of operators, in accordance with some example implementations;

When practical, similar reference numbers denote similar structures, features, or elements.

DETAILED DESCRIPTION

Figure 1A:
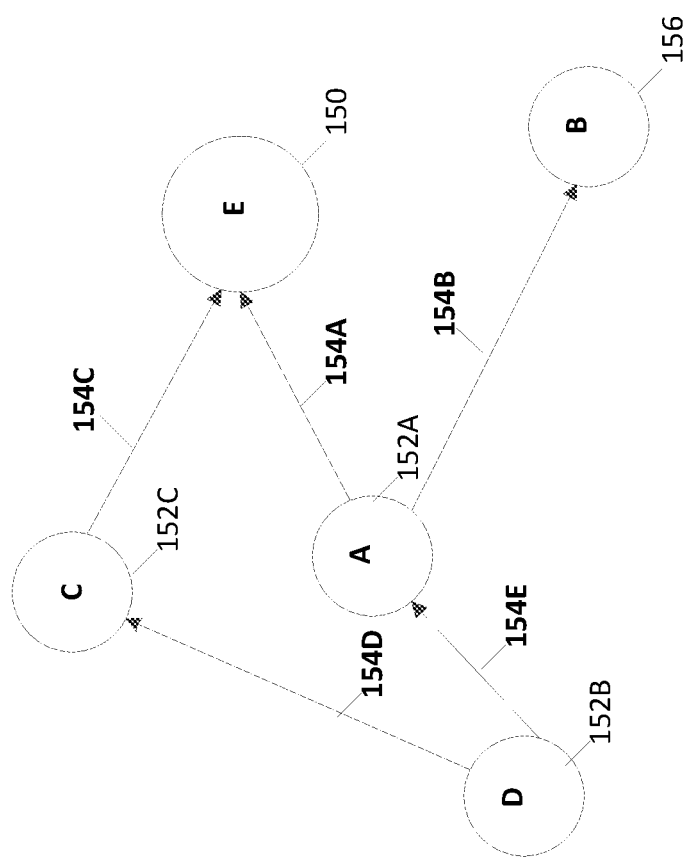

An in-memory relational database may utilize main memory for the primary storage of database tables. For example, the in-memory relational database may be implemented as a column-oriented database (e.g., a columnar database) that stores data from database tables by columns instead of by rows. In the case of the in-memory column-oriented relational database for example, each tuple may correspond to a record occupying a row of a database table while the columns of the database table may store the values of common attributes shared by multiple tuples, such that the values occupying each column of the database table (which may span multiple rows (or records) of the database table) may be stored sequentially in one or more data pages, with each data page storing at least a portion of a column. The in-memory column-oriented relational database may support efficient data compression and partitioning for massively parallel processing. Because the in-memory database is directly accessible by a central processing unit (CPU) of the computing engine, transactions accessing the in-memory database may be executed to provide near-instantaneous results.

The throughput and storage capacity of a database, such as the in-memory column-oriented relational database as well as other types of databases, may be maximized by distributing the processing and storage of data across multiple computing nodes. A single database table may therefore be divided into multiple partitions (or internal tables), for example, through hash partitioning, round-robin partitioning, and/or range partitioning, and then stored across multiple computing nodes. Doing so may maximize opportunities for parallelization in which a single query is divided into multiple tasks and assigned to individual worker threads for execution. As used herein, the term "worker thread" refers to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

Moreover, a database execution engine (which may also be referred to as a query execution engine or an execution engine, for short) may also use pipelining. In the case of pipelining, the database execution engine breaks up data of a table for example into smaller chunks of data, such that each smaller chunk of data can be processed for execution by a series of one or more operators. The operators refer to low-level executable operators, such as code that performs a specific operation during operator execution, rather than high-level relational algebra operators (also referred to as relations). In other words, when a query is received, the query may be expressed in the form of relational algebra but then formed into executable operators for execution. For example, the low-level executable operator may implement a lock on a database table, perform an index scan, perform a table scan at a given database, perform a limit operation (e.g., LimitOp), and/or the like.

During query plan generation (which may include query optimization), the relational algebra operators (or the corresponding executable operators) may be connected with each other to form a relation of operators such as a graph (e.g., a directed acyclic graph (DAG)). Operators with no outgoing links may split the DAG up into multiple pipelines. For example, a pipeline ends on an operator with no outgoing links and starts with an operator after the previous pipeline ended. Pipeline execution may be performed in a recurrent fashion, such that operator "n" of the pipeline takes a chunk of data as input, performs its operation ("n") on the input data, and then the operator "n" pushes its corresponding output to the next operator "n+1". After the last operator in the pipeline is done performing its operation, control is returned to a prior operator. For example, when operator n+1 is finished, execution control may return to a prior operator n. The operator n may (or may not) continue processing (for example, producing another piece of data and pushing it down the pipeline of operators, performing a cleanup task, freeing resources, and/or the like). In other words, the pipeline represents a set of data processing elements (e.g., operators) connected in series, such that during query execution the output of an operator of the pipeline is the input of the next element of the pipeline, and buffer storage may be used between the operators. In some instances, the operators of a pipeline can be executed in parallel, sequentially, and/or in a time-sliced fashion.

As noted, the database execution engine may process a query, such as an SQL query, so as the pipelining noted above is provided. During query plan generation for example, the query (which is received by the database execution engine) may be represented as relational algebra operators in a tree structure, such as a DAG, that describes the operations on the data (e.g., Join, OrderBy, GroupBy). These relations may have one or more child relations that produce for example input data for the corresponding parent relation. In other words, the relations of the DAG for example may include relational algebra operators (or executable operators) that during query execution transfer data using "chunks" representing the results of a relational algebra operator (or executable operator). During this pipelining process, chunks are always pushed during query execution from one operator to the next one. Unlike other engines, the pipelining approach allows the calculation of query results without having to store the entire intermediate result for each operator so an operator can begin calculations on a chunk that is already available.

FIG. 1A illustrates an example of a portion of a directed acyclic graph (DAG) for a pipeline where the circles correspond to operators 150, 152A-C, and 156, which are connected by links 154A, 154B, 154C, 154D, and 154E. The operators of a pipeline may, as noted, form or represent a directed acyclic graph, and each operator may have one or more outgoing links (which are used to push chunks of data during execution) to one or more other operators. Likewise, each operator may have one or more incoming links (which provide data to the operator) from one or more other operators.

FIG. 1B depicts another example of a portion of a directed acyclic graph including a pipeline including a table scan operator 160C that receives its input in chunks from a table 101. The table scan operator 160C outputs a chunk to another operator, such as a projection operator 160D, which similarly outputs its data in a chunk to one or more subsequent operators. In this way, the pipelining approach avoids having to store an entire intermediate result provided by a given operator, so a given operator can begin calculations as soon as it receives an input chunk.

In operation, there may be two phases of query processing. In a first phase ("query plan generation" phase) for example, the database execution engine may generate a query plan for execution. After the query plan generation phase, the database execution engine executes the query plan at runtime ("query plan execution" phase) to generate a response (e.g., a result set) for the query.

During query plan generation for example, a query is received by the database execution engine and relational algebra operators may be formed into a DAG including pipelines. Moreover, the input and output formats of the operators, such as the relational algebra operators (also referred to herein as relations), may be defined, such as data types, column order, row order, and/or the like). And the database execution engine may then generate executable operators from the relations and link the executable operators. For example, the relational algebra represented by the DAG may be used to generate executable operators in accordance with the DAG. As such, during query plan execution, the executable operators do their operations (e.g., calculations or other functions) on an actual data chunk and push their output results to the next, linked executable operator(s) as depicted in the DAGs of FIGS. 1A-B, for example.

Although pipelining may be used to generate a query plan and then execute the query plan, there can be instances where pipelining does not optimize execution of the query plan. As explained further below, a portion of a query plan may include operators that require and/or support execution using a complete result set (e.g., an entire intermediate result set), rather than execution using data chunks. In other words, a certain operator may not be able to performs its function or calculation using only a data chunk but instead the certain operator may need the entire result set provided as an input. For example, the certain operator may need an entire intermediate result set (rather than just a portion or chunk of that intermediate result) that is output by a prior operator. When the portion of a query plan includes operators that require and/or support execution using the entire intermediate result set, the database execution may bypass pipelining for those operators, in accordance with some implementations.

Rather than use chunks and pipelining, some relations and their corresponding executable operators may take as input (and/or provide as output) an entire intermediate result, which may be contained in a temporary table. In other words, the temporary table is used to store not only a chunk (e.g., portion) of a result but the entire intermediate result for an executable operator.

FIG. 1C depicts an example of a portion of a pipeline including operator 162A that requires an entire result set. In the example of FIG. 1C, the operator 162A requires its input as an entire intermediate result and the operator 162A outputs an entire intermediate result set. In this example, the database execution engine creates an operator 170A to generate a temporary table 102 to store the all of the chunks output by operator 160D in order to provide that entire intermediate result set to operator 162A. Likewise, the database execution engine creates an operator 170B for reading the temporary table 104 (where the output of operator 162A is placed) in chunks for the pipeline of subsequent operators. In the example of FIG. 1C, during query plan generation with pipelining, the database execution engine inserts into the query plan the creation of the temporary tables 102 and 104 to accommodate the operator 162A, which uses an entire result set of the prior operator's output (e.g., an intermediate result output by the prior operator rather than just a chunk from that prior operator).

The operator 162A may be any type of operator that requires as an input an entire intermediate result set for execution rather than a chunk (e.g., a portion but not the entire intermediate result). Alternatively, or additionally, the operator 162A may be any type of operator that outputs an entire intermediate result set rather than output only chunks. An example of operator 162A is a so-called "black box operator," which refers to non-relational operator that may be performed outside of (e.g., in a third party, legacy, or other environment) of the database execution engine's environment.

The temporary tables 102 and 104 may each correspond to a projection (e.g., an operator that provides the intermediate query result to other operators) of what is needed at an input or output of the operator 162A. In other words, the temporary tables contain the entire intermediate results provided at the input (e.g., from a prior child operator, such as operator 160D) or generated by operator 162A as an output. In the example of FIG. 1C, the operator 170B portions the temporary table 104 into chunks and pushes each chunk to subsequent operator(s) to enable the pipelining.

However, if a subsequent operator, such as subsequent operator 160E depicted at FIG. 1D, requires as an input an entire intermediate result set for execution, the chunks may be reassembled into another temporary table 108 as shown at FIG. 1D. Although this approach maintains operator pipelining, it is inefficient as at least twice as much memory is used to store the temporary table (see, e.g., temp table 104 and 108) and central processing resources are also needlessly consumed.

In some implementations, when a portion of the pipeline includes two operators that both require the intermediate result (i.e., a complete or entire result set rather than a partial data chunk) pipelining may be bypassed for the two operators. As such, data is not exchanged between the operators using chunks but instead data is exchanged using a state between the two operators.

Figure 1E:
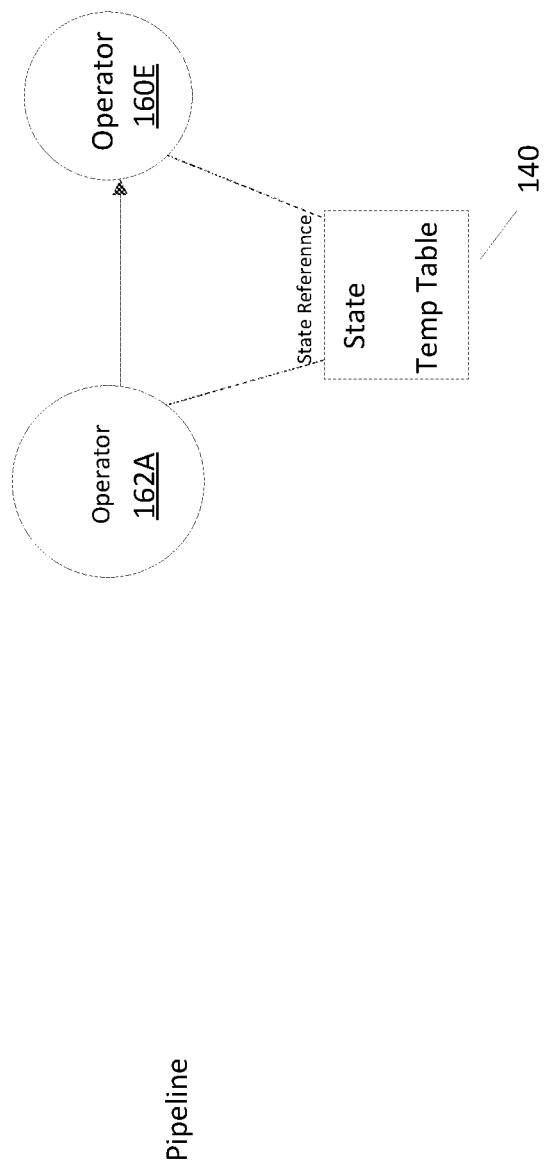

FIG. 1E depicts an example of two operators 162A and 160E, both of which operate using the intermediate result (i.e., a complete or entire result set rather than a partial data chunk). In the example of FIG. 1E, pipelining using data chunks is bypassed between operators 162A and 160E. Instead of transferring data using pipelining including chunks and the temporary tables 104 and 108, a state is used. The state may contain any data type or objects of any user-defined types that can be read from, and/or written to, by an operator during query plan execution. For example, the state can refer to an object, such as a temporary table. And, a state reference is used as a link or an identifier of a location (e.g., in memory) of the temporary table. To illustrate further, a state may contain a hash table or other data or objects which can be accessed one or more operators during query execution. When the state is shared by at least two operators, such as operators 162A and 160E, the state is referred to as a "shared stare."

During query plan generation for example, the operators, such as operators 162A and 160E, declare which states will be used during runtime (i.e., query execution time) and this state declaration can be detected by the database execution engine. If operators want to use a same "state" at runtime, the state is defined or marked as a shared at query plan generation time.

During query plan generation for example, an operator can request its input as a temporary table (or, e.g., request an input that is not in chunks) from a corresponding child operator. If a child operator supports an output result as the temporary table (i.e., data not in chunks but rather as an entire result set), the child operator offers a reference to the state ("state reference") to the parent operator, wherein the state is a location where the child operator will store (during query plan execution) the temporary table for consumption by the parent operator.

Referring to FIG. 1E, during query plan generation, the operator 160E can request its input as a temporary table (or as an input that is not in chunks but rather an entire result set). This request may be made to the database execution engine which extends the request to at least one child operator, such as the operator 162A, providing an input to the parent operator (which in this example is relation operator 160E). If the child relation operator 162A supports the output result as a temporary table, the operator 162A offers a state reference to a location (e.g., in memory) where the relation operator 162A will store (during query execution) the state containing the temporary table (which contains an entire intermediate result set rather than a portion of the result set such as a chunk). In this way, the operator 160E may, during query execution, retrieve the state directly by using the state reference. If the child relation operator 162A does not support the output result as a temporary table into the state, pipelining is not bypassed between operator 162A and operator 160E.

Before providing additional description regarding bypassing pipelining for certain operators, the following provides description regarding an example database management system in which pipeline bypassing can be practiced.

Figure 2A:
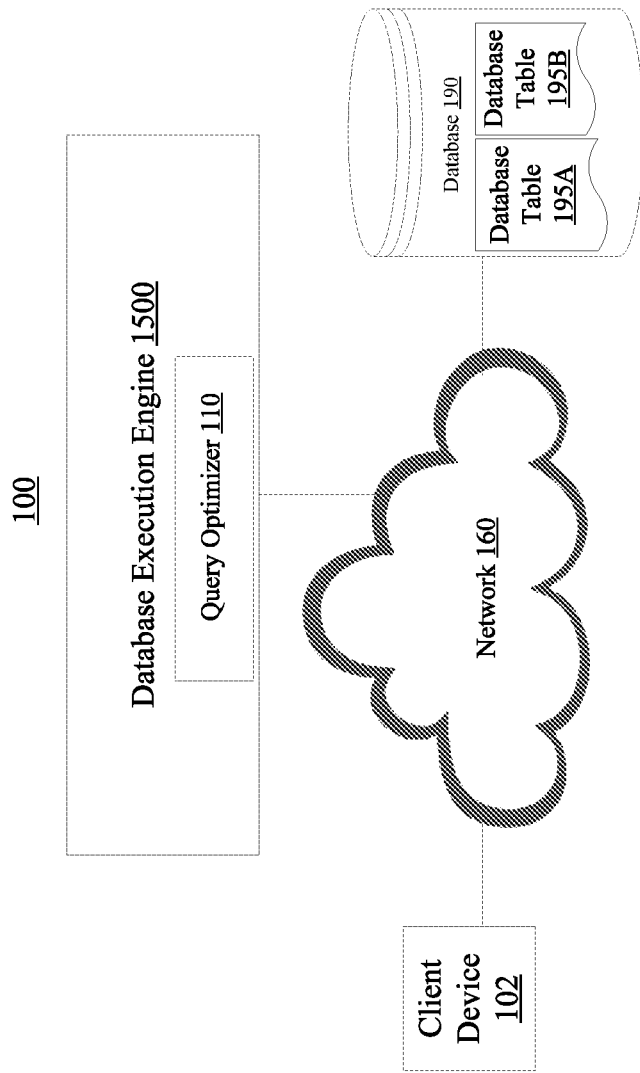
FIGS. 2A and 2B depict examples of system including database execution engines, in accordance with some example implementations.

FIG. 2A depicts a system diagram illustrating an example of a system 100, in accordance with some example implementations. Referring to FIG. 2A, the system 100 may include one or more client devices such as client device 102, a database execution engine 1500, and one or more databases, such as database 190. As shown in FIG. 2A, the one or more client devices 102, the database execution engine 1500, and the one or more databases 190 (which may include one or more database tables 195A-B) may be communicative coupled via a network 160. The database execution engine 1500 may include query optimizer 110 that may be used to determine whether pipelining should be bypassed for certain operators, in accordance with some implementations.

The one or more databases 190 may include a variety of relational database technologies including, for example, an in-memory database, a column-based database, a row-based database, hybrid database (e.g., combination of column and row based), and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2B:
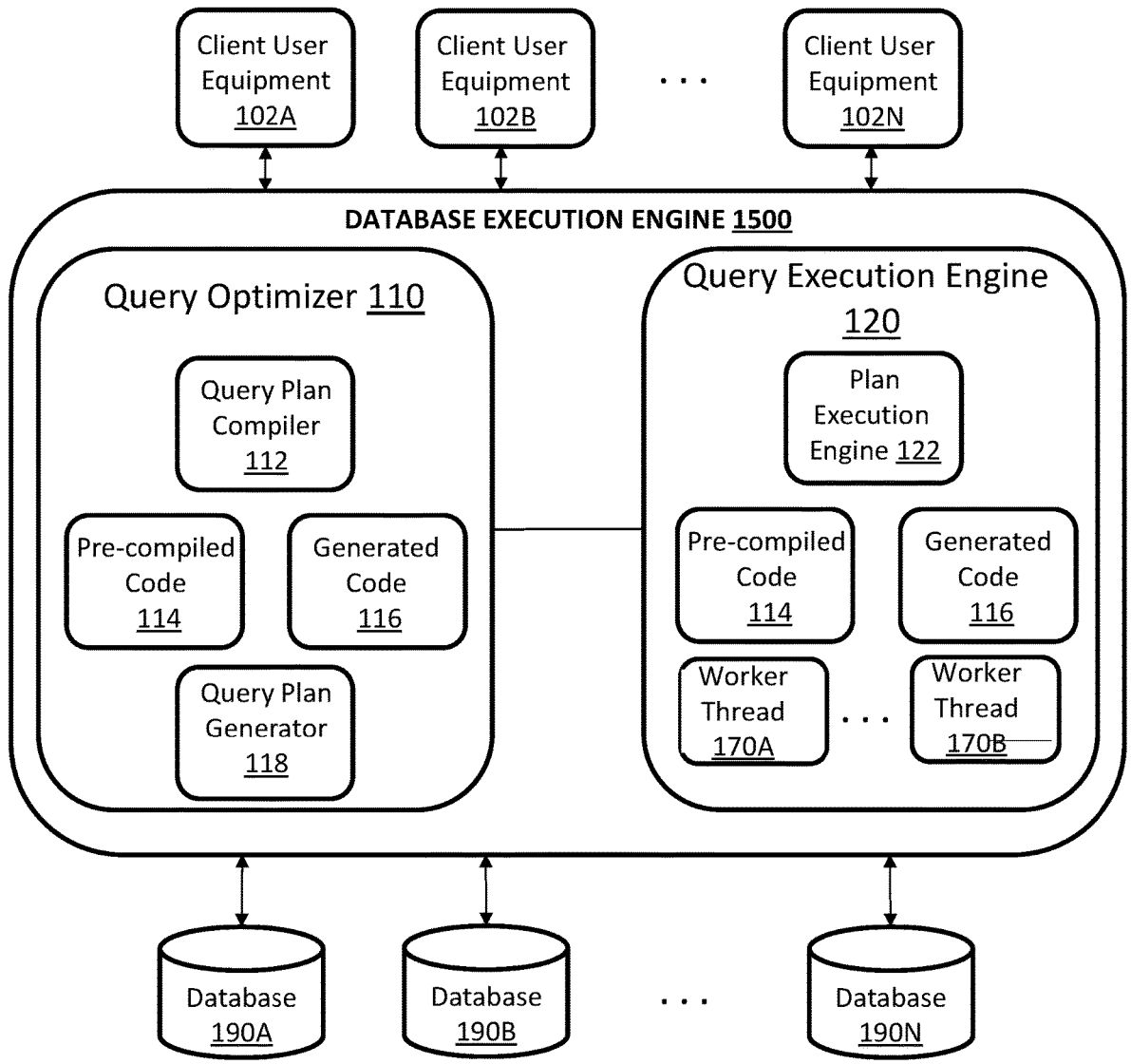

FIG. 2B depicts a block diagram illustrating an example implementation of the database execution engine 1500, in accordance with some example implementations. As shown in FIG. 2B, the one or more databases 190 (which may include a first database 190A, a second database 190B, and a third database 190C) may represent a database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102 (which may include the client devices (e.g., client user equipment) 102A-N) may send a query via the database execution engine 1500 to the database layer including the one or more databases 190, which may represent a persistence and/or storage layer where database tables may be stored and/or queried. The query may be sent via a connection, such as a wired connection and/or wireless connection (e.g., the Internet, cellular links, Wi-Fi links, and/or the like) provided, for example, by the network 160.

The database execution engine 1500 may include a query optimizer 110, such as an SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra" operators (e.g., relations) and may be in the form of a directed acyclic graph. The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

The query optimizer 110 may optimize the query plan (which may include the noted pipelines of operators) by compiling and generating code. Furthermore, the query optimizer may generate a DAG including operators which may be configured into one or more pipelines.

Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 1500 and sending some of the operations (or commands in support of an operation, such as a read, write, and/or the like) for execution at one or more of one or more database 190A-N.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190A-N include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database layer may provide distributed data storage in which the processing and storage of data is distributed across multiple nodes including, for example, the first database 190A, the second database 190B, the third database 190C, and/or the like. Accordingly, to store a database table 195A and/or 195B at the one or more databases 190, the database execution engine 1500 may divide the database table 195A and/or 195B into multiple partitions by applying one or more of a hash partitioning, round robin partitioning, and range partitioning.

Figure 3:
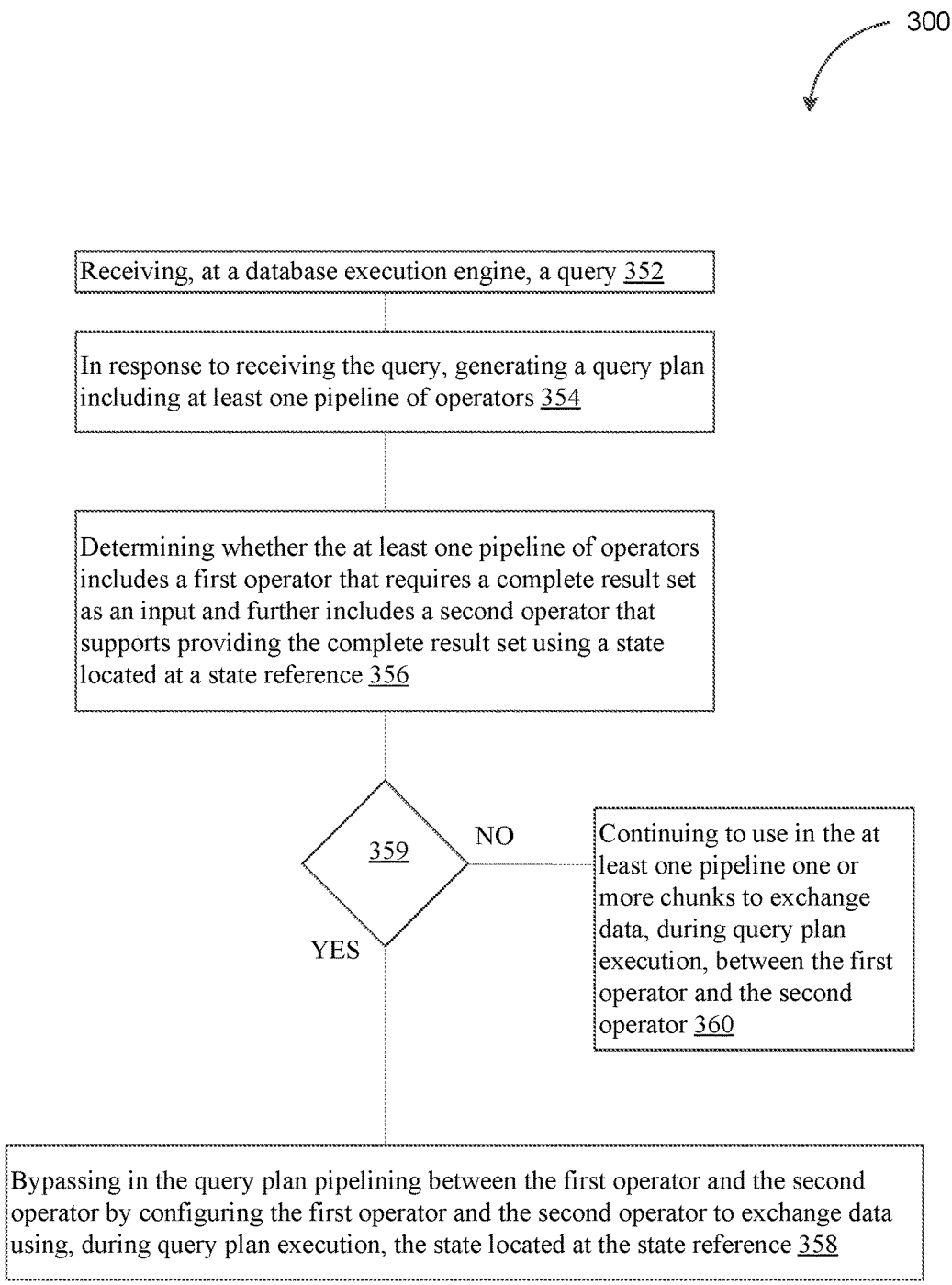
FIG. 3 depicts an example of a flow chart for bypassing pipelining of certain operators, in accordance with some example implementations.

FIG. 3 depicts a flowchart illustrating an example of a process 300 for bypassing pipelining for certain operators, in accordance with some example implementations.

At 352, a query may be received at a database execution engine. For example, the database execution engine may receive a query from a client device, such as client user equipment 102A. The query may be for example: select * from T1 left outer join T2 on T1.n=T2.n".

In response to receiving the query, generating, at 354, a query plan including at least one pipeline of operators. For example, the database execution engine 1500 may generate a query plan of operators (e.g., relational operators) and form a DAG. In this example, the database execution engine 1500 configures pipelining for the operators as a default configuration for the operators.

At 356, determining whether the at least one pipeline of operators includes a first operator that requires a complete result set as an input and further includes a second operator that supports providing the complete result set using a state identified by a state reference. Although as noted above, the database execution engine 1500 configures pipelining for the operators, the database execution engine may determine whether there is a need to bypass pipelining for certain operators. To that end, the database execution engine checks the operators of a pipeline, such as the pipeline of FIG. 1D to determine whether that pipeline of operators includes a first operator that requires a complete result set as an input (which in this example is operator 160E) and includes a second operator (which in this example is operators 162A) that supports providing the complete result set using a state identified by a state reference, as noted with respect to FIG. 1E. To illustrate further, a complete result set may be all of the data generated by a table scan, rather than just a chunk or a portion of that data.

In response to determining the at least one pipeline of operators includes the first operator that requires the complete result set as the input and further includes the second operator that supports providing the complete result set using the state identified by the state reference, bypassing, at 358, in the query plan pipelining between the first operator and the second operator by configuring the first operator and the second operator to exchange data using, during query plan execution, the state identified by the state reference. When the database execution engine determines that the operator 160E requires the complete result set as an input and the second operator 162A supports providing the complete result set using the state 140 identified by the state reference for example, the database execution engine may bypass pipelining between operator 162A and 160E and instead configure the data exchange during query plan execution via the state 140 depicted at the example of FIG. 1E. When this is the case, the executable operators (generated as part of query plan generation) for 162A and 160E will exchange (during query plan execution) data via the state 140, rather than using chunks. For example, the state may (at query plan execution time) be an object that include all of the data from a table scan.

In response to determining the second operator does not support providing the complete result set using the state identified by the state reference, continuing, at 360, to use in the at least one pipeline one or more chunks to exchange data, during query plan execution, between the first operator and the second operator. However, if the second operator 162A does not support providing the result set using the state, the database execution engine will not bypass the chunks used to exchange data between operator 162A and 160E so during query plan execution the temporary tables 104 and 108 (as well as the additional operator 170B) will be implemented during query plan execution.

Figure 4:
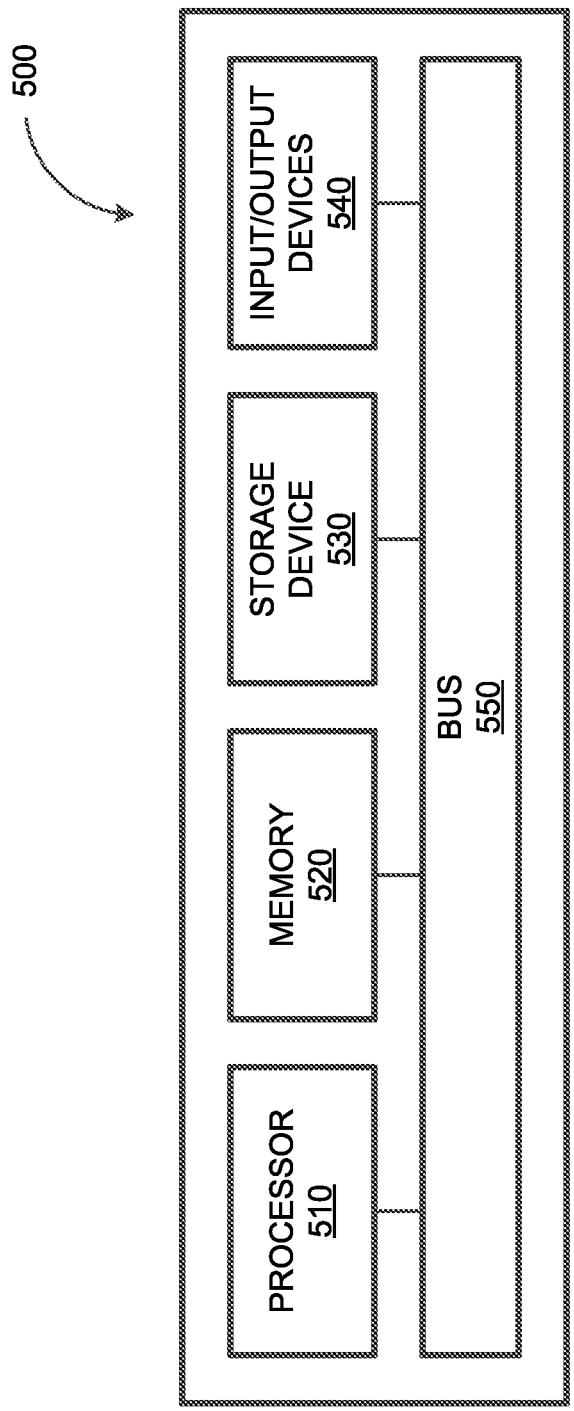
FIG. 4 depicts a block diagram illustrating an example of a computing system, in accordance with some example implementations.

FIG. 4 depicts a block diagram illustrating an example of a computing system 500 consistent with implementations of the current subject matter. Referring to FIGS. 1-4, the computing system 500 may implement the database execution engine 1500 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 1500. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
at least one data processor; and
at least one memory storing instructions which, when executed by the at least one data processor, cause operations comprising:
generating a query plan including at least one pipeline of operators;
determining whether the at least one pipeline of operators includes a first operator that requires a complete result set as an input and further includes a second operator that supports providing the complete result set using a state identified by a state reference;
in response to determining the at least one pipeline of operators includes the first operator that requires the complete result set as the input and further includes the second operator that supports providing the complete result set using the state identified by the state reference, bypassing in the query plan pipelining between the first operator and the second operator; and
in response to determining the second operator does not support providing the complete result set using the state identified by the state reference, continuing to use, in the at least one pipeline, one or more chunks to exchange data, during execution of the query plan, between the first operator and the second operator.

Example 2: The system of Example 1 further comprising:
receiving, at a database execution engine, a query from a client device.

Example 3: The system of any of Examples 1-2, wherein in response to receiving the query, the query plan is generated by the database execution engine.

Example 4: The system of any of Examples 1-3, wherein the complete result set comprises all of the data generated by a table scan, rather than a portion of the data.

Example 5: The system of any of Examples 1-4, wherein the state comprises an object that is generated during execution of the query plan to include all of the data from the table scan.

Example 6: The system of any of Examples 1-5, wherein the bypassing comprises configuring the first operator and the second operator to exchange data using, during execution of the query plan, the state identified by the state reference.

Example 7: The system of any of Examples 1-6 further comprising:
executing the query plan.

Example 8: The system of any of Examples 1-7, wherein during execution of the query plan that has been configured for the bypassing between the first operator and the second operator, data is exchanged between the first operator and the second operator using the state identified by the state reference.

Example 9: The system of any of Examples 1-8, wherein during execution of the query plan that continues to use the pipelining between the first operator and the second operator, data is exchanged between the first operator and the second operator using the one or more chunks.

Example 10: A method comprising:
generating a query plan including at least one pipeline of operators;
determining whether the at least one pipeline of operators includes a first operator that requires a complete result set as an input and further includes a second operator that supports providing the complete result set using a state identified by a state reference;
in response to determining the at least one pipeline of operators includes the first operator that requires the complete result set as the input and further includes the second operator that supports providing the complete result set using the state identified by the state reference, bypassing in the query plan pipelining between the first operator and the second operator; and
in response to determining the second operator does not support providing the complete result set using the state identified by the state reference, continuing to use, in the at least one pipeline, one or more chunks to exchange data, during execution of the query plan, between the first operator and the second operator.

Example 11: The method of Example 11 further comprising:
receiving, at a database execution engine, a query from a client device.

Example 12: The method of any of Examples 10-11, wherein in response to receiving the query, the query plan is generated by the database execution engine.

Example 13: The method of any of Examples 10-12, wherein the complete result set comprises all of the data generated by a table scan, rather than a portion of the data.

Example 14: The method of any of Examples 10-13 wherein the state comprises an object that is generated during execution of the query plan to include all of the data from the table scan.

Example 15: The method of any of Examples 10-14, wherein the bypassing comprises configuring the first operator and the second operator to exchange data using, during execution of the query plan, the state identified by the state reference.

Example 16: The method of any of Examples 10-15 further comprising:
executing the query plan.

Example 17: The method of any of Examples 10-16, wherein during execution of the query plan that has been configured for the bypassing between the first operator and the second operator, data is exchanged between the first operator and the second operator using the state identified by the state reference.

Example 18: The method of any of Examples 10-17, wherein during execution of the query plan that continues to use the pipelining between the first operator and the second operator, data is exchanged between the first operator and the second operator using the one or more chunks.

Example 19: A non-transitory computer-readable storage medium including instructions which, when executed by at least one data processor, cause operations comprising:
generating a query plan including at least one pipeline of operators;
determining whether the at least one pipeline of operators includes a first operator that requires a complete result set as an input and further includes a second operator that supports providing the complete result set using a state identified by a state reference;
in response to determining the at least one pipeline of operators includes the first operator that requires the complete result set as the input and further includes the second operator that supports providing the complete result set using the state identified by the state reference, bypassing in the query plan pipelining between the first operator and the second operator; and in response to determining the second operator does not support providing the complete result set using the state identified by the state reference, continuing to use, in the at least one pipeline, one or more chunks to exchange data, during execution of the query plan, between the first operator and the second operator.

Example 20: The non-transitory computer-readable storage medium of Example 19 further comprising: receiving, at a database execution engine, a query from a client device.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   generating a query plan including at least one pipeline of operators;
   determining whether the at least one pipeline of operators includes a first operator that requires a complete result set as an input and further includes a second operator that supports providing the complete result set using a state identified by a state reference;
   in response to determining the at least one pipeline of operators includes the first operator that requires the complete result set as the input and further includes the second operator that supports providing the complete result set using the state identified by the state reference, bypassing in the query plan pipelining between the first operator and the second operator; and
   in response to determining the second operator does not support providing the complete result set using the state identified by the state reference, continuing to use, in the at least one pipeline, one or more chunks to exchange data, during execution of the query plan, between the first operator and the second operator.

2. The system of claim 1, further comprising:
   receiving, at a database execution engine, a query from a client device.

3. The system of claim 2, wherein in response to receiving the query, the query plan is generated by the database execution engine.

4. The system of claim 1, wherein the complete result set comprises all of the data generated by a table scan, rather than a portion of the data.

5. The system of claim 4, wherein the state comprises an object that is generated during execution of the query plan to include all of the data from the table scan.

6. The system of claim 1, wherein the bypassing comprises configuring the first operator and the second operator to exchange data using, during execution of the query plan, the state identified by the state reference.

7. The system of claim 1, further comprising:
   executing the query plan.

8. The system of claim 7, wherein during execution of the query plan that has been configured for the bypassing between the first operator and the second operator, data is exchanged between the first operator and the second operator using the state identified by the state reference.

9. The system of claim 7, wherein during execution of the query plan that continues to use the pipelining between the first operator and the second operator, data is exchanged between the first operator and the second operator using the one or more chunks.

10. A method comprising:
    generating a query plan including at least one pipeline of operators;
    determining whether the at least one pipeline of operators includes a first operator that requires a complete result set as an input and further includes a second operator that supports providing the complete result set using a state identified by a state reference;
    in response to determining the at least one pipeline of operators includes the first operator that requires the complete result set as the input and further includes the second operator that supports providing the complete result set using the state identified by the state reference, bypassing in the query plan pipelining between the first operator and the second operator; and
    in response to determining the second operator does not support providing the complete result set using the state identified by the state reference, continuing to use, in the at least one pipeline, one or more chunks to exchange data, during execution of the query plan, between the first operator and the second operator.

11. The method of claim 10, further comprising:
    receiving, at a database execution engine, a query from a client device.

12. The method of claim 11, wherein in response to receiving the query, the query plan is generated by the database execution engine.

13. The method of claim 11, wherein the complete result set comprises all of the data generated by a table scan, rather than a portion of the data.

14. The method of claim 13, wherein the state comprises an object that is generated during execution of the query plan to include all of the data from the table scan.

15. The method of claim 10, wherein the bypassing comprises configuring the first operator and the second operator to exchange data using, during execution of the query plan, the state identified by the state reference.

16. The method of claim 10, further comprising:
    executing the query plan.

17. The method of claim 16, wherein during execution of the query plan that has been configured for the bypassing between the first operator and the second operator, data is exchanged between the first operator and the second operator using the state identified by the state reference.

18. The method of claim 16, wherein during execution of the query plan that continues to use the pipelining between the first operator and the second operator, data is exchanged between the first operator and the second operator using the one or more chunks.

19. A non-transitory computer-readable storage medium including instructions which, when executed by at least one data processor, cause operations comprising:
generating a query plan including at least one pipeline of operators;
determining whether the at least one pipeline of operators includes a first operator that requires a complete result set as an input and further includes a second operator that supports providing the complete result set using a state identified by a state reference;
in response to determining the at least one pipeline of operators includes the first operator that requires the complete result set as the input and further includes the second operator that supports providing the complete result set using the state identified by the state reference, bypassing in the query plan pipelining between the first operator and the second operator; and
in response to determining the second operator does not support providing the complete result set using the state identified by the state reference, continuing to use, in the at least one pipeline, one or more chunks to exchange data, during execution of the query plan, between the first operator and the second operator.

20. The non-transitory computer-readable storage medium of claim 19, further comprising:
receiving, at a database execution engine, a query from a client device.

* * * * *